Patented July 18, 1944

2,354,022

UNITED STATES PATENT OFFICE 2,354,022

PROCESS FOR THE MANUFACTURE OF SIEVE NETTINGS

Emil Hubert, Dessau-Ziebigk, and Herbert Rein, Leipzig, Germany; vested in the Alien Property Custodian No Drawing. Application December 22, 1939, Serial No. 310,552. In Germany December 22, 1938

4 Claims. (Cl. 28—72)

This invention relates to the manufacture of sieve nettings. Metal wire nettings are frequently used for various technical purposes, for instance as sieve grates, covering devices etc., as no other netting material shows the same elasticity and hardness needed for this purpose.

Surprisingly it was found, that wires consisting of polymerized artificial materials like polyvinyl chloride, polyvinyl formals or interpolymers of various vinyl compounds or of vinyl compounds with other unsaturated compounds, are most suitable for the manufacture of wire nettings, especially when these artificial wires are stretched during manufacture. In the same way other artificial materials are useful consisting of linear organic high polymers like condensed ω-aminocarboxylic acids or their functional derivatives, for instance esters or urethanes or of condensation products, which are obtained by intercondensing diamines with dicarboxylic acids or by polymerisation of lactams. As suitable raw materials of the last group may be mentioned the following: long chain condensation products consisting of 6-aminohexanoic acid or of urethane-δ-pelargonic acid, also polymerization products of ε-caprolactam hexamethylen or condensation products of hexamethylen-diamine and adipic acid or pentamethylendiamine and adipic acid.

Such artificial wires may be woven or plied just like metal wires without changing anything on the weaving machinery. Artificial sieve nettings obtained in this way approach very closely metal nettings regarding elasticity and resistance towards normal stress. By selecting amongst the above mentioned different groups of synthetic polymers and adding plasticizers or hardeners, it is possible to manufacture wire nettings of different hardness and elasticity.

Wire nettings according to the present invention have the advantage compared with metal nettings that they are of lower weight and not so easily subjected to corrosion in case they stay moist or soiled with sieved material. Furthermore they have the advantage especially when consisting of wires stretched during manufacture, to be shrunk by a heat shrinking process. In this way such fine-meshed nettings are obtained, as it would be impossible in a weaving process with metal wires. Furthermore it is possible to produce mixed nettings consisting of metal wires and wires of linear high polymers or artificial materials with polyvinyl chloride, in which for instance the warp is made of metal wires and the weft of the above mentioned organic high polymers. Also nettings for which metal wires together with organic high polymers of the above mentioned kind are employed, are valuable for many purposes.

We claim:

1. A process of producing fine-meshed sieve material which comprises stretching wires of a synthetic organic polymer during their manufacture, weaving the wires to form a meshed material and heat shrinking said meshed material to form the fine-meshed sieve material.

2. A process as in claim 1 in which the wires consist of polyvinyl chloride.

3. A process as in claim 1 in which the wires consist of a synthetic linear polyamide.

4. A process as in claim 1 in which the wires consist of interpolymers of vinyl compounds.

EMIL HUBERT.
HERBERT REIN.